United States Patent
Vinnedge

(10) Patent No.: US 9,425,601 B2
(45) Date of Patent: Aug. 23, 2016

(54) CURRENT SENSOR MOUNTING ADAPTOR

(71) Applicant: Honeywell International Inc., Morristown, NJ (US)

(72) Inventor: Kyle Vinnedge, Forreston, IL (US)

(73) Assignee: Honeywell International Inc., Morris Plains, NJ (US)

( * ) Notice: Subject to any disclaimer, the term of this patent is extended or adjusted under 35 U.S.C. 154(b) by 86 days.

(21) Appl. No.: 14/300,466

(22) Filed: Jun. 10, 2014

(65) Prior Publication Data

US 2015/0008009 A1    Jan. 8, 2015

Related U.S. Application Data

(60) Provisional application No. 61/842,274, filed on Jul. 2, 2013, provisional application No. 61/842,851, filed on Jul. 3, 2013.

(51) Int. Cl.
*H02G 5/04* (2006.01)
*H02G 5/02* (2006.01)
*H02B 13/035* (2006.01)

(52) U.S. Cl.
CPC ........... *H02G 5/025* (2013.01); *H02B 13/0356* (2013.01)

(58) Field of Classification Search
CPC ..... H02G 5/04; H02G 5/8025; H02B 13/0356
USPC ................................ 174/79, 99 B
See application file for complete search history.

(56) References Cited

U.S. PATENT DOCUMENTS

| | | | | |
|---|---|---|---|---|
| 7,450,368 B2 * | 11/2008 | Parker | ...................... | H02B 1/20 361/600 |
| 8,570,047 B1 * | 10/2013 | Davies | .............. | H01M 10/4207 307/17 |
| 8,687,358 B2 * | 4/2014 | Nakasaka | .......... | H05K 7/20927 361/679.47 |
| 8,811,015 B2 * | 8/2014 | Wagner | .............. | H05K 7/20927 165/80.4 |
| 9,086,440 B2 * | 7/2015 | Sakamoto | .......... | G01R 33/0094 |
| 2009/0128129 A1 * | 5/2009 | Aratani | ................ | G01R 15/207 324/117 H |
| 2011/0050222 A1 * | 3/2011 | Ueno | ................... | G01R 15/207 324/253 |
| 2015/0276814 A1 * | 10/2015 | Nakajima | ............ | G01R 15/148 324/244 |

FOREIGN PATENT DOCUMENTS

| | | | |
|---|---|---|---|
| JP | 2013246122 | * | 12/2013 |
| KR | 20120006309 | * | 1/2012 |

* cited by examiner

*Primary Examiner* — Timothy Thompson
*Assistant Examiner* — Charles Pizzuto
(74) *Attorney, Agent, or Firm* — Conley Rose, P.C.; Kristin Jordan Harkins

(57) ABSTRACT

Apparatus and associated methods relate to a mounting adapter which connects to a current sensor and provides an alignment of a bus bar to the current sensor while securely mounting the current sensor to the bus bar. In some embodiments, a mounting adapter may be inserted into an aperture of the current sensor. A bus bar may then be inserted into an aperture in the mounting adapter sized to receive the bus bar and to align it within the current sensor. The bus bar may substantially fill the entire aperture space which may lock the mounting adapter to the current sensor. In some embodiments the bus bar may be secured to the mounting adapter. The secure alignment and coupling of the bus bar to the current sensor via an exemplary mounting adapter may eliminate the need for separate mounting and alignment of the bus bar and current sensor.

20 Claims, 6 Drawing Sheets

CURRENT SENSOR MOUNTING ADAPTOR

CROSS-REFERENCE TO RELATED APPLICATIONS

This application claims the benefit of U.S. Provisional Application Ser. No. 61/842,274, titled "Current Sensor Mounting Adapter," filed by Kyle Vinnedge on Jul. 2, 2013. The instant application also claims the benefit of U.S. Provisional Application Ser. No. 61/842,851, titled "Current Sensor Mounting Adapter," filed by Kyle Vinnedge on Jul. 3, 2013. The entirety of each of the foregoing applications is hereby incorporated by reference.

TECHNICAL FIELD

Various embodiments relate generally to current sensors, and specifically to current sensors used in high-current applications.

BACKGROUND

Current sensors often have a large center hole that does not allow for direct mounting to the conductor that is being sensed. A bus bar is then routed through the center hole of the current sensor. If the bus bar is not centered in the hole of the current sensor the accuracy of the current sensor may be compromised. Often the current sensor is supported on a framework. This framework is often mounted to a separate structure from the bus bar. Because the framework and the bus bar may be separate structures, the sensor alignment to the conductor must be considered separately from mounting location considerations. Additionally, both the bus bar and the framework may be inflexible. To improve the alignment of the bus bar to the current sensor, the framework supporting the current sensor may require modification. Shims may be used to adjust the framework so that the bus bar becomes centered within the hole in the current sensor. This framework adjustment may take time to properly center the bus bar. This time may translate to additional expense for the purchaser of the current sensor.

SUMMARY

Apparatus and associated methods relate to a mounting adapter which connects to a current sensor and provides an alignment of a bus bar to the current sensor while securely mounting the current sensor to the bus bar. In some embodiments, a mounting adapter may be inserted into an aperture of the current sensor. A bus bar may then be inserted into an aperture in the mounting adapter sized to receive the bus bar and to align it within the current sensor. The bus bar may substantially fill the entire aperture space which may lock the mounting adapter to the current sensor. In some embodiments the bus bar may be secured to the mounting adapter. The secure alignment and coupling of the bus bar to the current sensor via an exemplary mounting adapter may eliminate the need for separate mounting and alignment of the bus bar and current sensor.

Various embodiments may achieve one or more advantages. For example, some embodiments may permit very quick installation of a current sensor. For example, the need for a separate framework to support the current sensor may be eliminated. In some embodiments, the bus bar may provide the support for the current sensor. An exemplary mounting adapter may provide a bus bar aperture that well centers a bus bar of predetermined size. An exemplary bus bar aperture may simultaneously provide good alignment of the bus bar to the current sensor and secure support of the current sensor by the bus bar.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
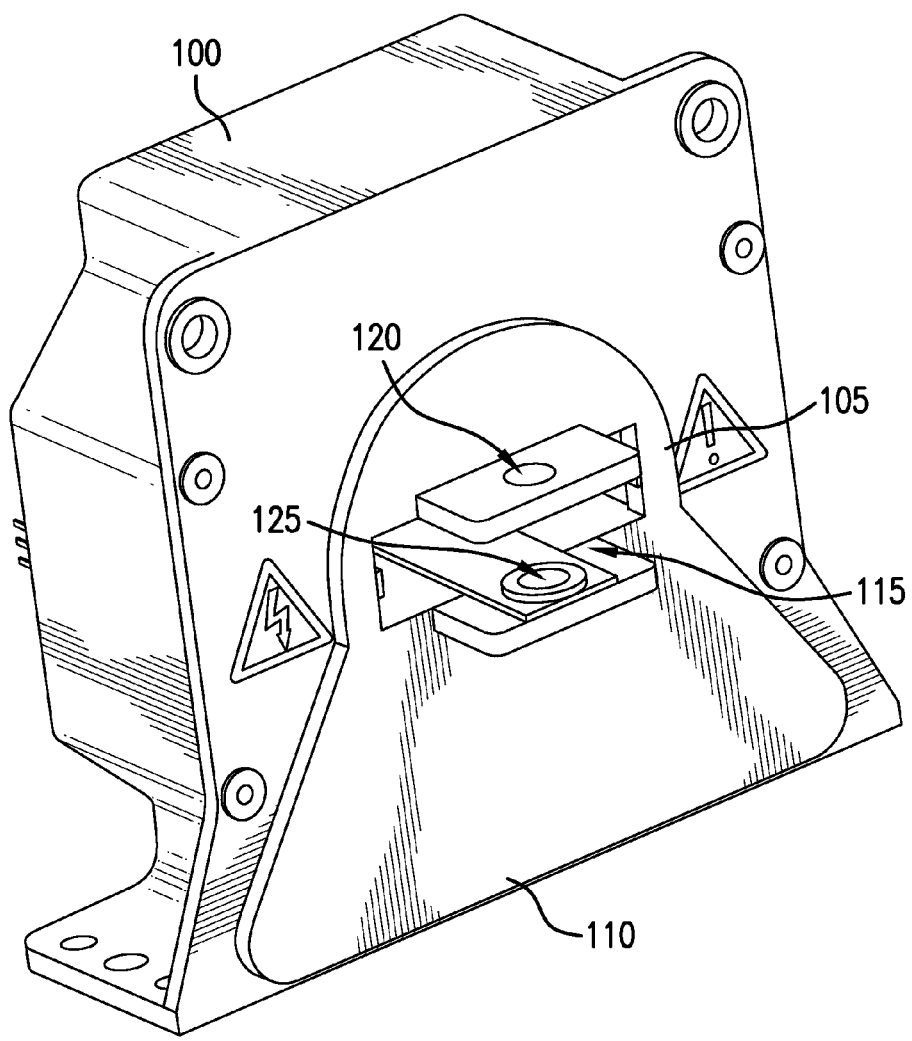
FIG. 1 depicts a front perspective view of an exemplary mounting adapter located within the aperture of an exemplary current sensor.

FIG. 1 depicts a front perspective view of an exemplary mounting adapter located within the aperture of an exemplary current sensor. In this figure, an exemplary current sensor 100 is depicted with an attached exemplary mounting adapter 105. The exemplary mounting adapter 105 may have been toollessly inserted into a hole in the current sensor 100. The exemplary mounting adapter 105 is shown with a rectangular bus bar aperture 115. The mounting adapter 105 is depicted with a front face 110 which may prevent the over insertion of the mounting adapter. Two bus bar mounting holes 120, 125 are shown aligned one to another so as to permit a bolt to secure the mounting adapter 105 to a bus bar.

Figure 2:
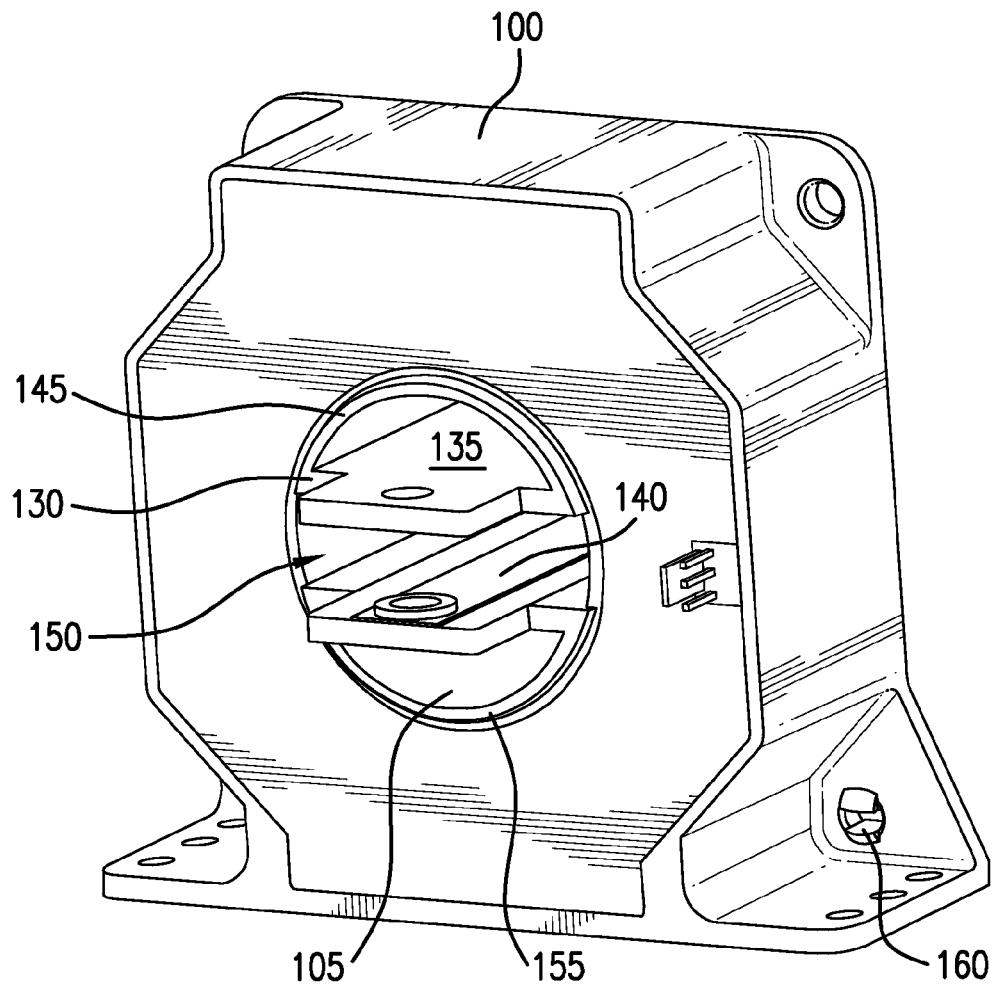
FIG. 2 depicts a rear perspective view of an exemplary mounting adapter located within the aperture of an exemplary current sensor.

FIG. 2 depicts a rear perspective view of an exemplary mounting adapter located within the aperture of an exemplary current sensor. In this figure, a current sensor 100 is shown attached to a mounting adapter 105 from the perspective of an inserted end 130 of the mounting adapter 105. The figure depicts a top plate 135 and a bottom plate 140. The top plate 135 and the bottom plate 140 may tightly couple a bus bar of a predetermined thickness. A top semi-circular lip 145 overlaps the circular aperture 150 of the current sensor 100. A similar bottom semi-circular lip 155 overlaps the circular aperture 150 of the current sensor 100. The top circular lip 145 is coupled to the top plate 135, and the bottom circular lip 155 is coupled to the bottom plate 140. When the inserted end 130 of the mounting adapter 105 is inserted into the circular aperture 150 of the current sensor 100, the top plate 135 and bottom plate 140 may be compressed together due to a deformation that may result from the top circular lip 145 and bottom circular lip 155 being forced into a circular aperture 150 undersized for the natural dimensions of the two circular lips 145, 155. The mounting adapter 105 has a rotational control member 160 that is coupled to a complementary feature of the current sensor 100. The rotational control member 160 may inhibit a rotation of the mounting adapter 105 within the circular aperture 150 of the current sensor 100, for example.

In various embodiments, a mounting adapter may be toollessly connected to a current sensor using other mechanisms. For example, the mounting bracket may be in two parts, one that inserts into a current sensor, and one that toollessly attaches securely to the inserted end of the mounting bracket. In some embodiments, the mounting bracket may snap into the aperture of a current sensor. In an exemplary embodiment a mounting bracket may be configured to attach to a feature of a pre-existing current sensor.

Figure 3:
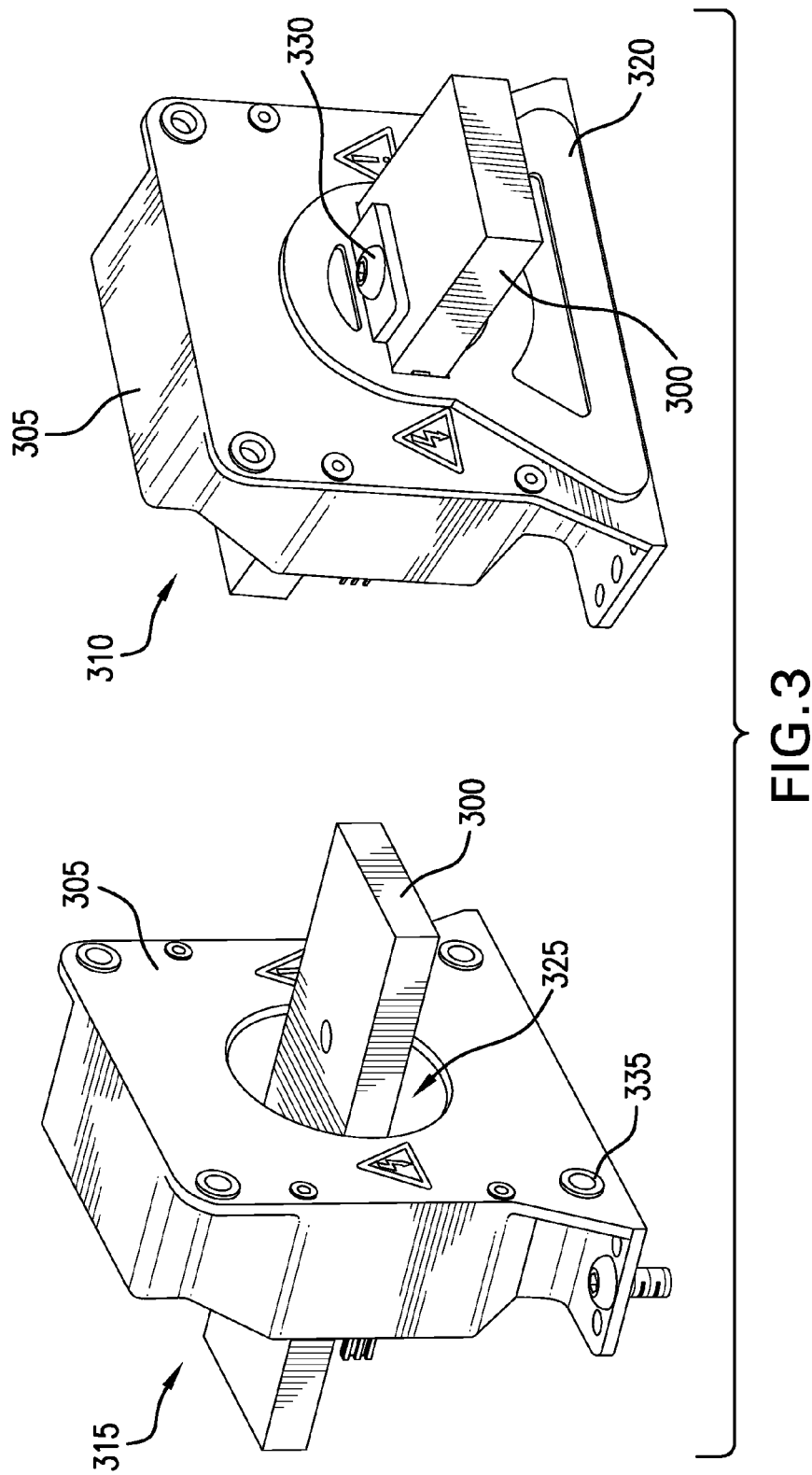
FIG. 3 depicts perspective views of a bus bar within the aperture of an exemplary current sensor both with and without an exemplary mounting bracket.

FIG. 3 depicts perspective views of a bus bar within the aperture of an exemplary current sensor both with and without an exemplary mounting bracket. In this figure, configurations of a bus bar 300 within a current sensor 305 are depicted both with 310 and without 315 an exemplary mounting adapter 320. In the 315 figure, the bus bar 300 is shown with space around it within a circular aperture 325 of the current sensor 305. The bus bar is depicted with freedom to move up/down, left/right, in/out of the aperture. In the 310 figure, the mounting bracket 320 is shown providing precise up/down alignment within the circular aperture 325 of the current sensor 305. Precise left/right alignment is shown to be the result of an attachment bolt 330. A second attachment bolt may provide left/right alignment on the rear side of the aperture (not shown). This attachment bolt 330 may also provide in/out alignment and secure coupling of the current sensor 305 to the bus bar 300. The current sensor 305 has a rotational control feature 335 for coupling with a complementary rotational control feature of the mounting bracket 330. In some embodiments, rotational control of the mounting bracket may be performed by detent features. In an exemplary embodiment, rotational control may be performed by an aperture and an aperture traversing member.

Figure 4:
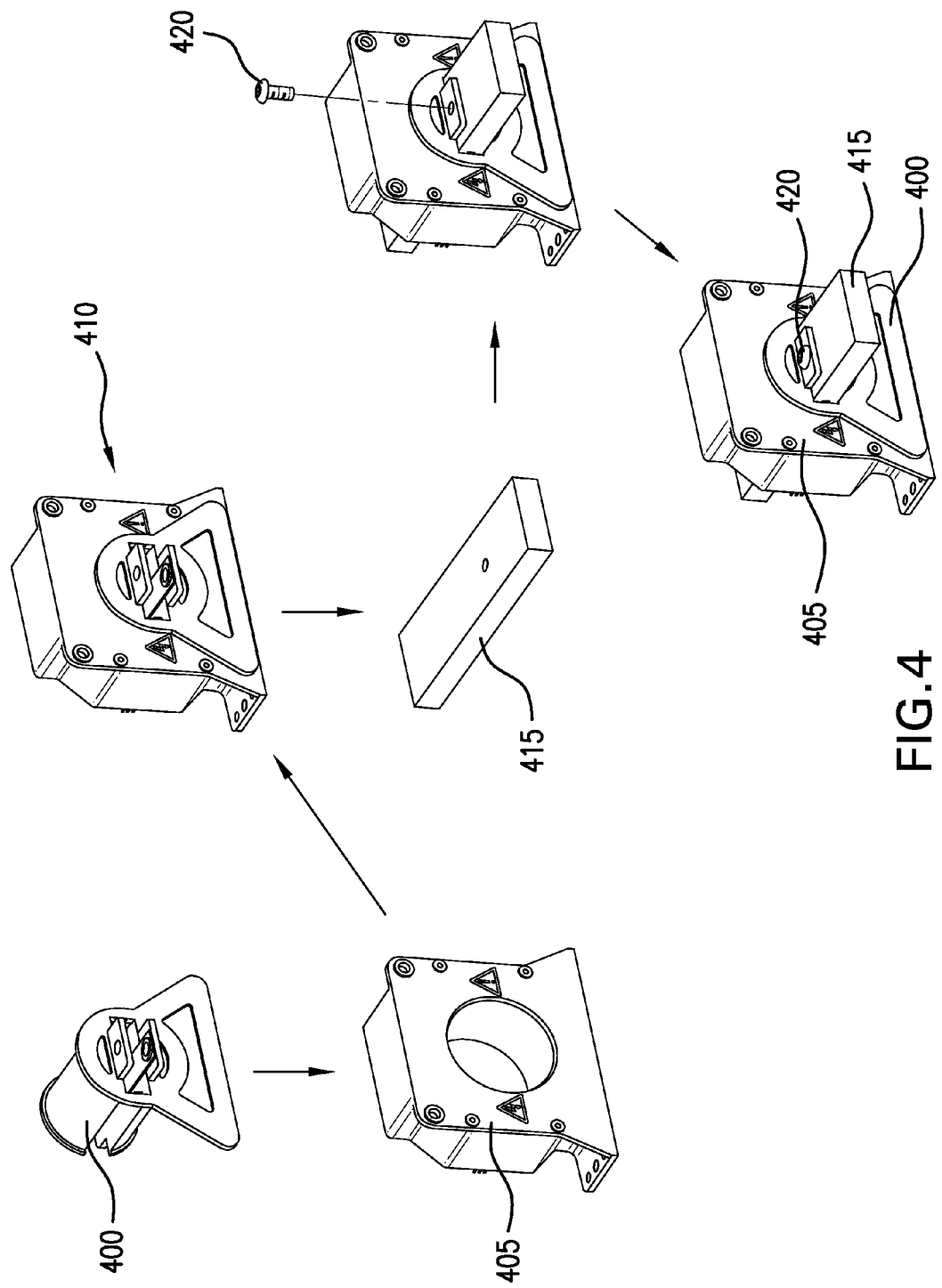
FIG. 4 depicts an exemplary method of affixing an exemplary current sensor to a bus bar using an exemplary mounting bracket.

FIG. 4 depicts an exemplary method of affixing an exemplary current sensor to a bus bar using an exemplary mounting bracket. In this figure, a mounting bracket 400 and a current sensor 405 are shown in isolation. The mounting bracket may then be affixed to the current sensor, resulting in a current sensor with mounting bracket 410. A bus bar 415 may then be inserted into the mounting bracket already affixed to the current sensor 410. The inserted bus bar 415 may occupy substantially the entire rectangular bus bar aperture of the mounting bracket 400. This occupation of substantially the entire rectangular aperture may lock the mounting bracket 400 to the current sensor 405. A mounting bolt 420 is depicted as securing the bus bar 415 to the mounting bracket 405. This mounting bolt 420 may then securely couple the sensor to the bus bar while simultaneously properly aligning the bus bar 415 within the current sensor 405.

Figure 5:
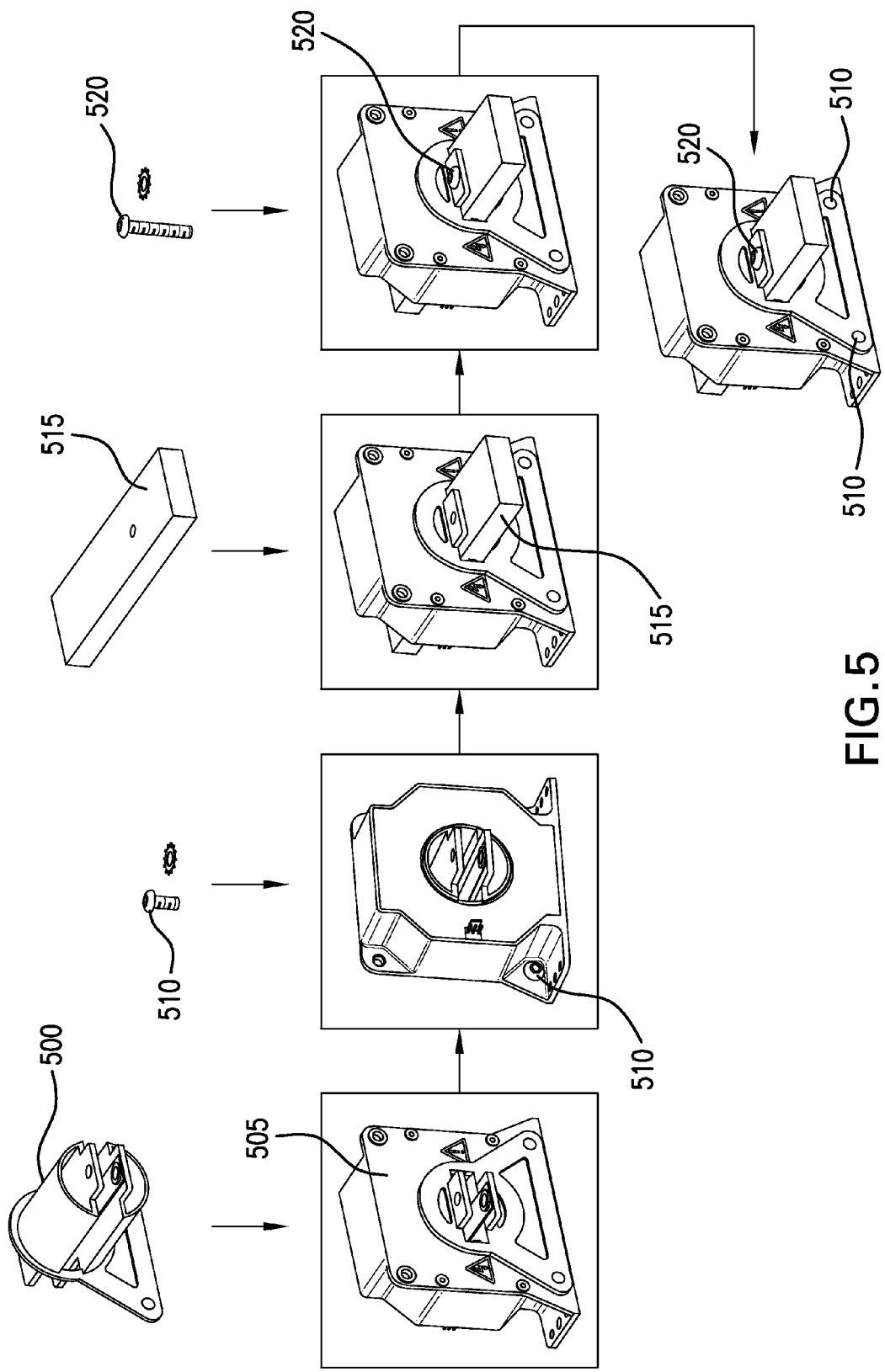
FIG. 5 depicts an exemplary method of affixing an exemplary current sensor to a bus bar using an exemplary mounting bracket.

FIG. 5 depicts an exemplary method of affixing an exemplary current sensor to a bus bar using an exemplary mounting bracket. In this figure, an exemplary mounting bracket 500 is inserted into a current sensor 505. The mounting bracket 500 may have a boss that aligns to a hole in the current sensor 505, for example, so as to prevent the mounting bracket 500 from rotating relative to the current sensor 505. In the displayed embodiment, two self-tapping screws 510 are used to ensure that the mounting bracket 500 does not rotate within the current sensor 505. These self-tapping screws may be inserted in through-holes from behind the face of the current sensor, for example. The screws may then self-tap into the polymer material of the mounting bracket. A bus bar 515 is then inserted into a bus bar shaped aperture in the mounting bracket 500. Another self tapping screw 520 is used in this exemplary embodiment to secure the bus bar 515 to the mounting bracket 500. The self-tapping screw 520 is inserted into a through-hole in a top plate of the mounting bracket 500. The screw then passes through a through-hole in the bus bar and then self-taps into an interference hole in a bottom plate of the mounting bracket 500.

Figure 6:
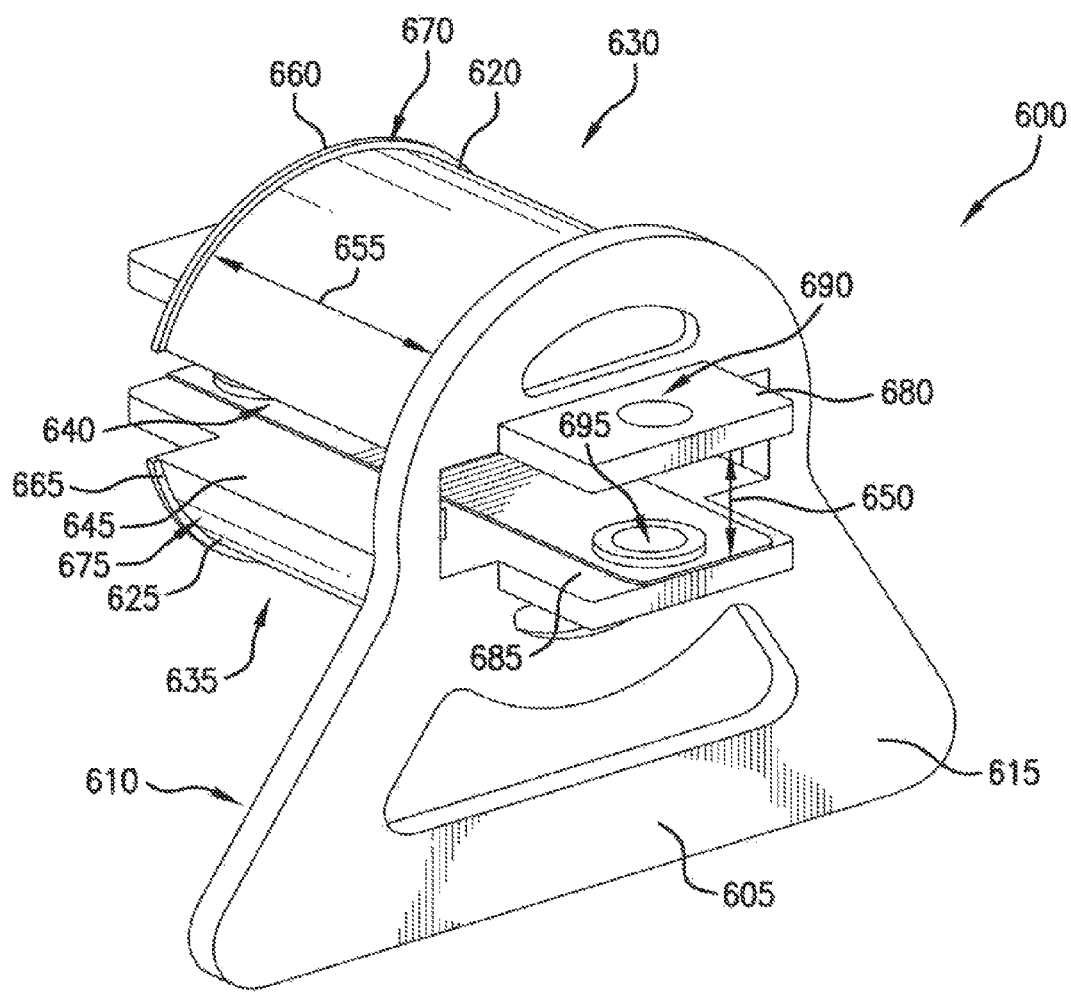
FIG. 6 depicts an exemplary mounting adapter for mounting a bus bar to a current-sensing meter.

FIG. 6 depicts an exemplary mounting adapter for mounting a bus bar to a current-sensing meter. In FIG. 6, an exemplary mounting adapter 600 includes a face plate 605. The face plate 605 has a first surface 610 and a second surface 615. Two cylindrical bus bar centering members 620 and 625 project substantially perpendicular from the first surface 610 of the face plate 605. Each of the two bus bar centering members 620 625 has an exterior surface 630 635 each configured to engage a substantially cylindrical aperture of a current-sensing meter. Each of the two bus bar centering members 620 625 has an interior surface 640 645 configured to engage a face of a bus bar. The interior surfaces 640, 645 are substantially planar and parallel to one another. A separation distance 650 between the two interior surfaces 640, 645 is configured to receive a bus bar having a thickness approximately equal to the separation distance 650. At a distal end of each of the bus bar centering members, the ends being distal from the first surface 610, is a securing member 660 665. The securing members 660 665 project radially outward from an axial center of a cylindrical aperture of the current-sensing meter, when the mounting adapter is mounting therein. Each securing member 660 665 has a securing face 670 675 configured to engage a rear face of the current-sensing meter. A separation distance 655 between the securing face 670, 675 and the first surface 610 of the face plate 605 is configured to accommodate a thickness of the current-sensing meter. The face plate 605 may engage a front face of the current sensing meter while the securing faces 670 675 are engaging a rear face of the current sensing meter. Bus bar retention tabs 680, 685 may project substantially perpendicular from the second surface 615 of the face plate 605. Each of the bus bar retention tabs 680 685 may have a retention feature 690 695 for retaining a bus bar. In the depicted embodiment, the retention features may be circular apertures. In some embodiments, one retention feature may be a circular aperture, and another may be a pilot hole, for example. A bus bar may be secured by inserting a screw, for example through the aperture, and through a hole in the bus bar, and then self-tap into the second retention feature.

Many such methods of attaching a mounting bracket to a current sensor and a bus bar are possible. For example, a mounting bracket may have alignment features that are mirrored in the current sensor, such that when the mounting bracket is snapped into the circular aperture of the current sensor, the registration between the mounting bracket and current sensor may be fixed. Raised features in the face of the current sensor with complementary recessed features in the mating face of the mounting bracket are an example of such a method. A mounting bracket may have bosses that pass through holes in the face of the current sensor, for example. In an exemplary embodiment, the bosses may be further secured using self-tapping nuts. Push pins may be used, where the pins are pushed into panel clips that have been pressed into through holes, for example. A molded bushing may be pressed into a hole in the current sensor face, and standard screw may be used to connect the mounting bracket to the current sensor. Some methods of attachment may permit toolless connection for some connection steps, while others may require the use of tools.

Although various embodiments have been described with reference to the Figures, other embodiments are possible. For example, an exemplary mounting adapter may permit a current sensor to mount directly to a conductor in use. In some embodiments the mounting adapter may be manufactured into several configurations to be used on various current sensors and conductors. The direct mount configuration could improve the repeatability of the current sensor from application to application since positioning relative to the conductor may be more consistent. Mounting a current sensor directly to a bus bar may eliminate the need to route the bus bar near a mounting panel for the sensor which may reduce the length of the bus bar and may reduce the overall size of the equipment.

When an exemplary mounting adapter is snapped into a current sensor and mounted to a bus bar, the bus bar may fill the gap in the adapter, which may prevent the mounting bracket from being unsnapped accidentally. Various bus bar cavity shapes may be created in various embodiments of mounting brackets. For example, a circular bus bar cavity may be used to center and secure a round cable to a current sensor. In some embodiments, the cable may be insulated. In some embodiments, non-conductive materials may be used for the mounting bracket which may permit bare cables or bare bus bars to be secured to the current sensor.

In some embodiments, ribs and holes in a mounting adapter may permit for a tight fit to the bus bar and also may permit for cooling air to pass between the bus bar and the mounting adapter. In some embodiments, holes in the mounting adapter may keep the temperature of the bus bar from substantially conducting to the current sensor.

In some embodiments the mounting adapter may be made using an injection molding process. In an exemplary embodiment a mounting bracket may be assembled directly to a finished current sensor to change the mounting configuration of the current sensor to a direct mount method. Exemplary mounting adapters may be made to accommodate bus bars of various dimensions. In some embodiments, mounting brackets may permit retrofit to existing bus bar and current sensors. For example, an exemplary mounting bracket may have an open slot for the bus bar to slide into the mounting bracket. The bracket may then slide into the current sensor, for example. In other embodiments, the mounting bracket may be of a clam shell type so as to permit a bus bar access to capture.

In an illustrative embodiment a mounting adapter to align and secure a bus bar within a substantially cylindrical aperture of a current-sensing meter may include a face plate having a first surface and a second surface. The first surface may be configured to engage a planar first face of a housing of the current-sensing meter. In some embodiments, the mounting adapter may include two complementary bus bar centering members each projecting substantially perpendicularly from first surface of the face plate member. In an exemplary embodiment, each of the two complementary bus bar centering members may have an exterior surface configured to engage a semi-annular portion of an interior surface of the substantially cylindrical aperture. Each of the two complementary bus bar centering members may have a substantially planar surface for engaging a bus bar. The substantially planar surfaces of the two complementary bus bar centering members may be substantially parallel to and facing one another at a separation distance of at least a predetermined bus bar thickness.

In some embodiments, the mounting adapter may include a retention tab projecting radially away from the exterior surface at a distal projecting end of each of the two complementary bus bar centering members. An exemplary retention tab may have a retention surface configured to engage a second face on an opposite side of the housing relative to the planar first face of the housing. An exemplary retention surface may face the first surface of the face plate. The retention surface may be separated from the first surface of the face plate by a separation distance of at least a predetermined axial length of the substantially cylindrical aperture.

In some embodiments, the mounting adapter may include two securement tabs each projecting substantially perpendicular from the second surface of the face plate. Exemplary securement tabs may have a substantially planar surface for engaging a bus bar. The substantially planar surfaces of the two securement tabs may be substantially parallel to and facing one another at a separation distance of at least the predetermined bus bar thickness.

In some embodiments, a bus bar securing aperture may be located in each of the two securement tabs. Exemplary bus bar securing apertures may be aligned to one another. Exemplary bus bar securing apertures may be configured to secure a bus bar to the mounting adapter via a fastener passing through both bus bar securing apertures and an aligned hole in the bus bar.

In some embodiments, when the distal projecting ends are inserted into a proximal end of the substantially cylindrical aperture of a current-sensing meter, radially distal ends of the retention tabs may engage the interior surface of the substantially cylindrical aperture. Exemplary engagement of the tabs with the interior surface may deflect the two complementary bus bar centering members toward each other at the distal projecting ends. Exemplary deflection of the two complementary bus bar centering members may reduce the separation distance of the substantially planar surfaces at the distal projecting ends of the two complementary bus bar centering members to less than the predetermined bus bar thickness.

In an exemplary embodiment, when the two complementary bus bar centering members are fully inserted into the substantially cylindrical aperture, the first surface may engage the planar first face of the housing. When fully inserted, the retention tabs may emerge from a distal end of the substantially cylindrical aperture. The separation distance at the distal projecting end of the substantially planar surfaces of the two complementary bus bar centering members may return to its undeflected dimension of being at least the predetermined bus bar thickness and the retention surfaces of the retention tabs engage the second face of the housing.

In some embodiments, when a bus bar is then inserted between the substantially parallel bus bar engaging surfaces now within the substantially cylindrical cavity, the bus bar may prevent deflection of the two complementary bus bar centering members. Preventing such deflection may maintain the separation distance at the distal projecting end to at least the predetermined bus bar thickness.

In some embodiments, the mounting adapter may include a rotation prevention member configured to align with a securing aperture on the current-sensing meter, wherein when a fastener is passed through the securing aperture and coupled to the rotation prevention member, rotation of the mounting adapter within the substantially cylindrical aperture is inhibited.

In various embodiments, the two complementary bus bar centering members each may have portions that are substantially shaped as axial slices of a cylinder. A slicing plane may be parallel to a central axis of the right circular cylinder. In some embodiments, the axial slices may be substantially congruent to each other. In some examples, the shape may be that of a smaller portion of the two portions of the cylinder sliced by a plane that is parallel to a central axis of the cylinder. In some embodiments, the distance between the slicing plane and the central axis may be at least one-half the predetermined bus bar thickness. In an exemplary embodiment, the exterior surfaces of the two complementary bus bar centering members each may share a common radius from a central axis of the substantially cylindrical aperture.

In some embodiments, a diameter distance from the radially distal end of the retention tab of one of the two complementary bus bar centering members to the radially distal end of the retention tab of the other of the two complementary bus bar centering members may be greater than the diameter of the substantially cylindrical aperture.

Various embodiments may use various means for securing a bus bar to the mounting adapter. For example, in some embodiments a bus bar may be secured to the mounting adapter using a fastener. In some embodiments, the fastener may be a threaded fastener. In some embodiments, the fastener may be a non-threaded fastener. In an exemplary embodiment the fastener may be a rivet. In an exemplary embodiment the fastener may be bolt and/or screw.

Various embodiments may use various means for preventing rotation of the mounting adapter within the substantially cylindrical aperture of the current-sensing meter. For example, in some embodiments, a detent may inhibit the rotation of the mounting adapter. In an exemplary embodiment, a fastener may secure the mounting adapter to the current-sensing meter. In some embodiments, a block or stop may be positioned to prevent rotation of the mounting adapter.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. A bracket for spatially aligning a current sensor with respect to a conductor carrying a current to be measured by the current sensor, the bracket comprising:
    a first bus bar centering member configured to extend axially through an aperture of a current sensor, the first bus bar centering member having a first interior surface to engage a conductor;
    a second bus bar centering member configured to extend axially through the aperture of a current sensor, the second bus bar centering member having a second interior surface to engage a conductor at a separation distance from the first interior surface based on a thickness of the conductor;
    a base member connecting to a proximal end of the first bus bar centering member and to a proximal end of the second bus bar centering member;
    a first securing lip extending radially from the first bus bar centering member to engage opposing exterior surfaces of the current sensor between the base member and the first securing lip; and,
    a rotational control member on the base member, wherein coupling the rotational control member to a complementary feature of the current sensor inhibits rotation of the first and second bus bar centering members within the aperture of the current sensor.

2. The bracket of claim 1, further comprising a second securing lip extending radially from the second bus bar centering member to engage the opposing exterior surfaces of the current sensor between the base member and the second securing lip.

3. The bracket of claim 1, wherein the aperture of the current sensor is cylindrical.

4. The bracket of claim 1, wherein the first and second interior surfaces are each substantially planar.

5. The bracket of claim 1, wherein the first and second interior surfaces each has a substantially cylindrically shaped portion to engage a conductor having a round cross-section.

6. The bracket of claim 1, wherein the bracket comprises non-conductive materials.

7. The bracket of claim 1, wherein the bracket comprises plastic.

8. The bracket of claim 1, wherein the rotational control member comprises a fastener.

9. The bracket of claim 1, wherein the rotational control member comprises a stop.

10. The bracket of claim 1, further comprising a bus bar coupling member configured to securely couple the bracket to the conductor.

11. A bracket for spatially aligning a current sensor with respect to a conductor carrying a current to be measured by the current sensor, the bracket comprising:
    a first bus bar centering member configured to extend axially through an aperture of a current sensor, the first bus bar centering member having a first interior surface to engage a conductor;
    a second bus bar centering member configured to extend axially through the aperture of a current sensor, the second bus bar centering member having a second interior surface to engage a conductor at a separation distance from the first interior surface based on a thickness of the conductor;
    a base member connecting to a proximal end of the first bus bar centering member and to a proximal end of the second bus bar centering member; and,
    a first securing lip extending radially from the first bus bar centering member to engage opposing exterior surfaces of the current sensor between the base member and the first securing lip.

12. The bracket of claim 11, further comprising a second securing lip extending radially from the second bus bar centering member to engage the opposing exterior surfaces of the current sensor between the base member and the second securing lip.

13. The bracket of claim 11, wherein when distal ends of the first and second bus bar centering members are inserted into the aperture, the first securing lip engages an interior surface of the aperture causing the first and second bus bar centering member to deflect toward each other, thereby reducing the separation distance to less than the thickness of the conductor.

14. The bracket of claim 11, wherein when a distal end of the first bus bar centering member projects through the aperture and a conductor is inserted through the aperture, the base member engages a first of the opposing exterior surfaces and the first securing lip engages a second of the opposing exterior surfaces.

15. The bracket of claim 11, further comprising a bus bar securing member configured to couple the bracket to the conductor.

16. A bracket for spatially aligning a current sensor with respect to a conductor carrying a current to be measured by the current sensor, the bracket comprising:
    a first bus bar centering member configured to extend axially through an aperture of a current sensor, the first bus bar centering member having a first interior surface to engage a conductor;
    a second bus bar centering member configured to extend axially through the aperture of a current sensor, the second bus bar centering member having a second interior surface to engage a conductor at a separation distance from the first interior surface based on a thickness of the conductor;

a base member connecting to a proximal end of the first bus bar centering member and to a proximal end of the second bus bar centering member; and, means for overlapping the aperture at a distal end of the first bus bar centering member when the first bus bar centering member is fully inserted into the aperture.

17. The bracket of claim 16, wherein the means for overlapping the aperture at the distal end of the first bus bar centering member comprises a securing lip coupled to the first bus bar centering member.

18. The bracket of claim 16, wherein the means for overlapping the aperture at the distal end of the first bus bar centering member comprises a tab connected to the first bus bar centering member and extending radially away from a center axis of the aperture when the first bus bar centering member is fully inserted into the aperture.

19. The bracket of claim 16, further comprising means for inhibiting rotation of the bracket when the first bus bar centering member is fully inserted into the aperture.

20. The bracket of claim 16, further comprising means for securing the conductor to the current sensor.

* * * * *